(12) United States Patent
Degenhardt et al.

(10) Patent No.: US 7,132,962 B1
(45) Date of Patent: Nov. 7, 2006

(54) METHODS AND APPARATUSES FOR CHARACTER CONVERSION CONTROL

(75) Inventors: Jon R. Degenhardt, Mountain View, CA (US); Peter A. Thorson, Oakland, CA (US)

(73) Assignee: Siebel Systems, Inc., San Mateo, CA (US)

( * ) Notice: Subject to any disclaimer, the term of this patent is extended or adjusted under 35 U.S.C. 154(b) by 755 days.

(21) Appl. No.: 10/177,712

(22) Filed: Jun. 20, 2002

(51) Int. Cl.
*H03M 7/00* (2006.01)
*G06F 15/00* (2006.01)

(52) U.S. Cl. .............................. 341/50; 715/542; 704/2

(58) Field of Classification Search ................. 341/50, 341/90, 106; 715/542; 704/2, 8, 9
See application file for complete search history.

(56) References Cited

U.S. PATENT DOCUMENTS

| | | | |
|---|---|---|---|
| 5,682,158 A | * | 10/1997 | Edberg et al. ................ 341/90 |
| 6,363,337 B1 | * | 3/2002 | Amith ........................... 704/7 |
| 6,922,812 B1 | * | 7/2005 | Broussard et al. .......... 715/542 |
| 2003/0014545 A1 | * | 1/2003 | Broussard et al. .......... 709/250 |
| 2004/0261024 A1 | * | 12/2004 | Storisteanu ................. 715/530 |

\* cited by examiner

*Primary Examiner*—Peguy JeanPierre
(74) *Attorney, Agent, or Firm*—Campbell Stephenson Ascolese LLP

(57) ABSTRACT

An embodiment of the present invention describes a method for controlling character set conversion. A request for data from a first computing system using a first character set is received by a second computing system using a second character set. The first character set is a subset of the second character set. Prior to transmitting the requested data, the second computing system performs a simulated conversion of the data from the second character set to the first character set. The simulated conversion identifies the prospective character set conversion failures and error-handling response of the first computing system's character conversion routine. The second computing system identifies and stores prospective character conversion failures and uses this information to determine responsive action including pre-empting the data transmission.

16 Claims, 4 Drawing Sheets

METHODS AND APPARATUSES FOR CHARACTER CONVERSION CONTROL

FIELD

Embodiments of the present invention relate generally to data conversion between computing systems and more specifically to methods and apparatuses for controlling the conversion of character sets.

BACKGROUND

The growing trend toward multinational organizations has given rise to a corresponding need for fast, efficient, and accurate data conversion between various computer character sets generally corresponding to different human languages.

Typically in computing systems, the internal representation of characters is designed for one alphabet. For example, a computing system may be designed to represent western European characters corresponding to the languages that use this alphabet (e.g., English, French, German, etc.), but would not be able to represent languages using other characters (Cyrillic, Arabic, Japanese, Chinese, etc.)

Computer representation of characters typically assigns every character of the alphabet a unique numeric value. This means that a character set that represents each character using 8-bits can have only 256 characters. A 256-character character set is sufficient to represent the western European alphabet or Cyrillic (though not concurrently), but is insufficient for languages that employ more characters (e.g., Japanese, Chinese, etc.). Languages having large character sets have employed a two-byte (16 bit) representation of characters. Such character sets may employ a multi-byte encoding, with, for example, the first byte indicating the number of bytes used to represent the character. Such encoding did not provide the capability to combine character sets. So, for example, it was not possible to combine western European and Japanese or Japanese and Chinese character sets.

Unicode was developed to cover all major languages and character sets. Unicode represents each character using 16 bits and therefore can uniquely identify more than 60,000 characters. This means that a Unicode character set acts as a superset for all the existing character sets for various languages, alphabets, or character sets.

However, the majority of extant systems are not Unicode and there is, therefore, substantial need for conversion between various character sets. A computing system using Unicode can communicate with external computing systems employing various character sets, but there must be a conversion between Unicode and the character set of the external computing system.

A character set conversion problem may occur when converting code between Unicode and other character sets. For example, consider a multinational organization having a Unicode-based central computing system communicating data between two external computing systems the first using a Chinese character set and the second using a Japanese character set. There may be a need to send data from the first external computing system to the second external computing system. Chinese character set characters converted to Unicode may not be entirely convertible to Japanese character set characters. So, when the Japanese external computing system attempts to convert the Unicode it will not be able to represent Chinese character set characters. This will cause a character conversion failure.

Typically, one of two strategies is employed when a character conversion failure occurs. The first is to use a replacement character for the unknown character. The replacement character indicates that proper conversion did not take place for the particular character, but the conversion continues. The second, known as a "hard error" means that the conversion is halted, that is, the data is not converted.

Depending on the situation, either strategy may be preferable. For example, for display data it may be better to provide as much valid data as possible and provide a substitute character where proper conversion has not occurred. On the other hand, invalid conversion of a financial transaction may warrant termination of the conversion and other corrective action. In either case it may be prudent to provide a notification of the failed conversion. This could take the form of an entry to a log file or event log and may precipitate manual corrective intervention.

The character conversion can be done in one of two places, it can be done at the central Unicode-based computing system, or it can be done at the external computing system. If the conversion is done at the central computing system, there are usually specified error-handling procedures and corrective mechanisms. That is, the central computing system has complete control of the conversion. However, if the data conduit is a Unicode-enabled communication stream (e.g., xml), then the Unicode-based system simply transmits the Unicode data and the external computing system must complete the character conversion. That is, the outgoing data format must match the format supported by the data communications stream.

Typically, data sent across a communication stream may consist of three types: textual data content, non-textual data content, and message format and control information. The textual data content is that portion of the data that is encoded using the character set of the communication stream and is converted to the character set of the external computing system upon receipt. The non-textual data content (e.g., image data), on the other hand is not subject to character conversion. The format and control information, which may or may not be textual, is not part of the data content and subject to character conversion when received by the external system. External computing systems use a variety of format and control information, which may employ a hierarchical or other structured format. A central computing system may use a single hierarchical format when storing data internally. Such a central computing system may store metadata, which is data that describes how to convert the internally stored data into the format and control information of an external system. This metadata, which is not transmitted with the message data, describes how to add any necessary format and control data required for the particular message format being transmitted. That is, as data is received from various systems over various communications streams, the particular message format and control information is replaced with common message format and control information. When the data is transferred over a given communication stream, the common message format and control information is replaced with message format and control information corresponding to the communication stream. The outgoing communications stream often supports Unicode, necessitating character conversion at the external computing system.

The problem with performing the character conversion on the external computing system is that many of these external computing systems, using various character sets, provide only limited or constrained error handling capabilities. For example, some database systems provide character substitution only with no hard error or notification capabilities. This can be extremely problematic where a hard error or notification is required. If the external computing system ignores conversion errors, the data on the external computing system may be corrupted. This may cause the external computing system to behave in an incorrect fashion.

Moreover, at a later time, the corrupted data may be sent back to the central computing system. Typically, a standard substitution character is a common character (e.g., "?") and may go unnoticed by the central computing system. Because the central computing system is unaware of the data corruption, the central computing system stores the corrupt data in its database, overwriting the valid data. This is known as round-trip error and can significantly compound the problem of corrupt data as other internal and external applications access the corrupt data. The problem is compounded if the now corrupt data is subsequently sent to other external computing systems.

Even if the external computing system handles the character conversion errors in an appropriate manner, the external computing system does not provide notification of the error to the central computing system. This means that corrective action (e.g., validation and retransmission, updating log file, etc.) does not occur.

SUMMARY

An embodiment of the present invention describes a method for controlling character set conversion. A request for data from a first computing system using a first character set is received by a second computing system using a second character set. The first character set is a subset of the second character set. A simulated conversion of the data from the second character set to the first character set is performed. Based upon the result of the simulated conversion an action is taken.

Other features and advantages of the present invention will be apparent from the accompanying drawings, and form the detailed description, that follows below.

BRIEF DESCRIPTION OF THE DRAWINGS

Embodiments of the present invention are illustrated by way of example, and not limitation, by the figures of the accompanying drawings in which like references indicate similar elements and in which.

DETAILED DESCRIPTION

Embodiments of the invention provide a method and system for character conversion control in which a central computing system determines character conversion failures prior to data transmission. For one embodiment, a Unicode-based central computing system employs a validation service to identify prospective character set conversion failures and error-handling response of an external computing system's character set conversion routine. For one embodiment, the central computing system identifies and stores potential character conversion failures and uses this information to determine responsive action.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

In the following detailed description of exemplary embodiments of the present invention, numerous specific details are set forth in order to provide a thorough understanding of the described embodiments of the present invention. However, it will be apparent to one skilled in the art that alternative embodiments of the present invention may be practiced without these specific details. In some instances, well-known structures and devices are shown in block diagram form, rather than in detail, in order to avoid obscuring the description of exemplary embodiments of the present invention.

Figure 1:
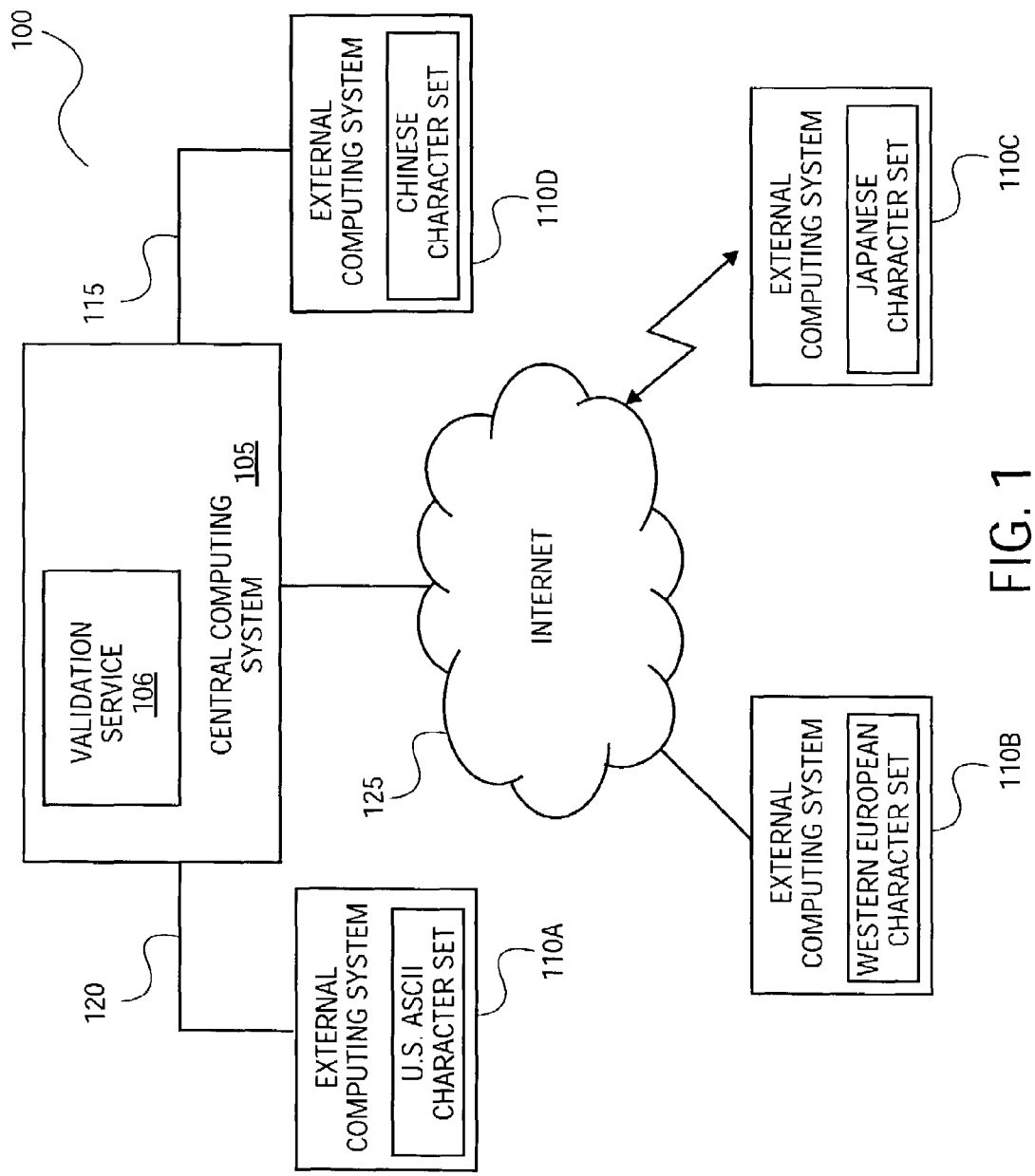
FIG. 1 illustrates a network of computing systems in which character conversion control may be implemented in accordance with one embodiment of the present invention.

FIG. 1 illustrates a network of computing systems in which character conversion control may be implemented in accordance with one embodiment of the present invention. Network 100 includes a central computing system 105 employing a Unicode character set. A plurality of local or remote external computing systems 110a–110d are coupled to the central computing system. External computing systems 110a–110d may use various character sets. For example, external computing system 110a may use U.S. ASCII, external computing system 110b may use western European, external computing system 110C may use Japanese, and external computing system 110d may use Chinese. For purposes of illustrating the invention, the central computing system 105 employs a Unicode character set. However, it will be evident to one skilled in the art that, in general, an embodiment of the present invention may be used where the central computing system employs a character set that is a superset of the external computing system's character set. For example, for one embodiment of the present invention, the central computing system uses a western European character set and an external computing system uses U.S. ASCII. As discussed above, Unicode was designed to be a superset of existing character sets.

The central computing system 105 may be coupled to external computing systems over short distances as part of a local area network (LAN) 115. Additionally or alternatively, the central computing system 105 may be coupled to external computing systems over long distances via telephone lines or satellite links as part of a wide area network 120 (WAN) or over the internet 125. The internet 125 is a network of networks through which information is exchanged via the use of protocols (e.g., TCP, IP) as known in the art.

For purposes of illustrating an embodiment of the invention, network 100 may be viewed as the computer network of a multinational organization having a central computing system 105 using a Unicode character set and several regional computing systems using a variety of other character sets. Information to be shared between regional computing systems may contain incompatible characters (characters from different character sets). For example, external computing system 110*b* may represent a regional computing system in Germany providing data in German and using a western European character set. This data is stored to central computing system 105 in Unicode. External computing system 110*c*, representing a regional computing system in Japan and using a Japanese character set, may request access to this information. Validation service 106, located on central computing system 105, performs a simulated conversion of the data from Unicode to the Japanese character set. Based upon prospective character set conversion failures identified by validation service 106, central computing system 105 takes appropriate action as described below.

Figure 2:
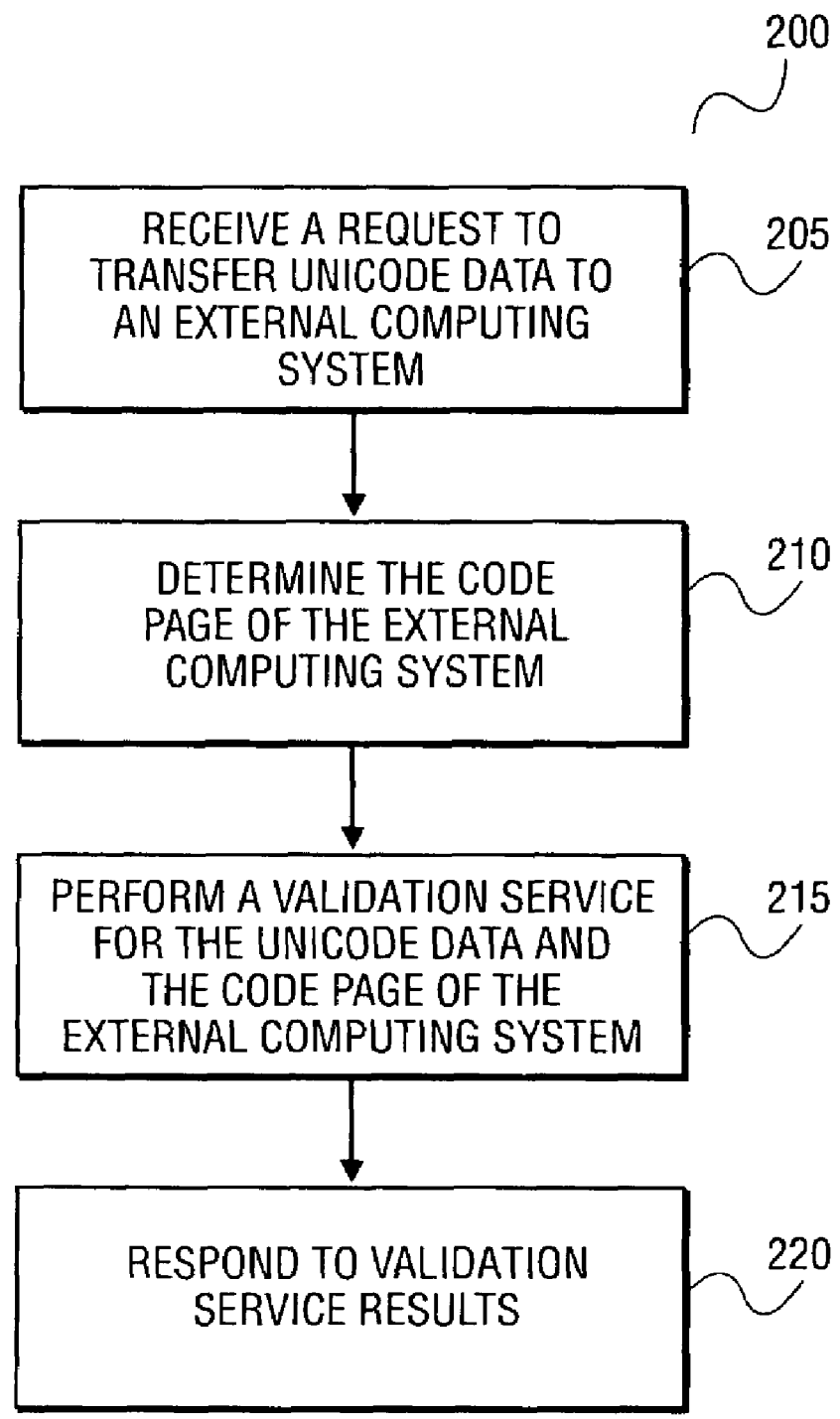
FIG. 2 is a process flow diagram in accordance with one embodiment of the present invention.

FIG. 2 is a process flow diagram in accordance with one embodiment of the present invention. Process 200 begins at operation 205 in which a central computing system receives a request to transfer data to an external computing system. The external computing system may request the data transfer, or the central computing system may, itself, initiate the transfer of data.

At operation 210 the character set being used by the external computing system is determined. A system manager can determine the character set programmatically. For example, a system manager may have established communication with a given external computing system and may be aware of the character set in use at that system. In alternative embodiments, the central computing system may have transport and connection utilities that allow the external computing system to be queried as to the character set in use. Or the request itself may provide the character set information. For example, if the request from the external system is in the http format, it may contain a character set announcement which is used by the central computing system to identify the character set in use at the external system.

At operation 215 a validation service is performed for the requested data and the external computing system character set. The validation service identifies prospective character set conversion failures and error-handling results of the external computing system. The validation service, in essence, simulates the results of a character set conversion at the external computing system. The validation service does not produce the converted data, but identifies character set conversion failures that may occur if the data is converted. In this way, the use of memory resources is reduced because memory need not be allocated to store converted data. For one embodiment, the central computing system distinguishes between the textual data content and the message format and control information. For example, the central computing system may use a metadata description of the message format to make such distinctions. The validation process can then operate on the data having the hierarchical structure of the central computing system before it is converted to the message format of the outgoing communication stream. Only relevant textual data content is subject to validation. In this way, false errors due to the simulated conversion of message format and control information are avoided.

At operation 220 the central computing system responds to the prospective character conversion failures and error-handling results. For example, if no character conversion failures are identified, the central computing system may transmit the data as requested for conversion by the external computing system. Where character conversion failures are identified, the external system may respond in any number of ways including not transmitting the data. The response taken by the central computing system will vary with particular circumstances. For example, the central computing system may simply log prospective character set conversion failures identified. The log may determine some further intervention potentially manual intervention. Additionally, or alternatively, the central computing system may accomplish the conversion and replace the substitution characters of the external system character set with its own substitution characters. This may allow the substitutions to be readily identified or may allow the transaction to be accomplished in cases where the external computing system would terminate the transaction due to hard error.

In one embodiment, the response may even include transmitting the data to another external system that can adequately convert and use the data. For example, the central computing system may have several external systems that are all providing a general service. If one of them can't handle a particular transaction, but another can, the central computing system may reroute the transaction based upon the results of the validation service.

Figure 3:
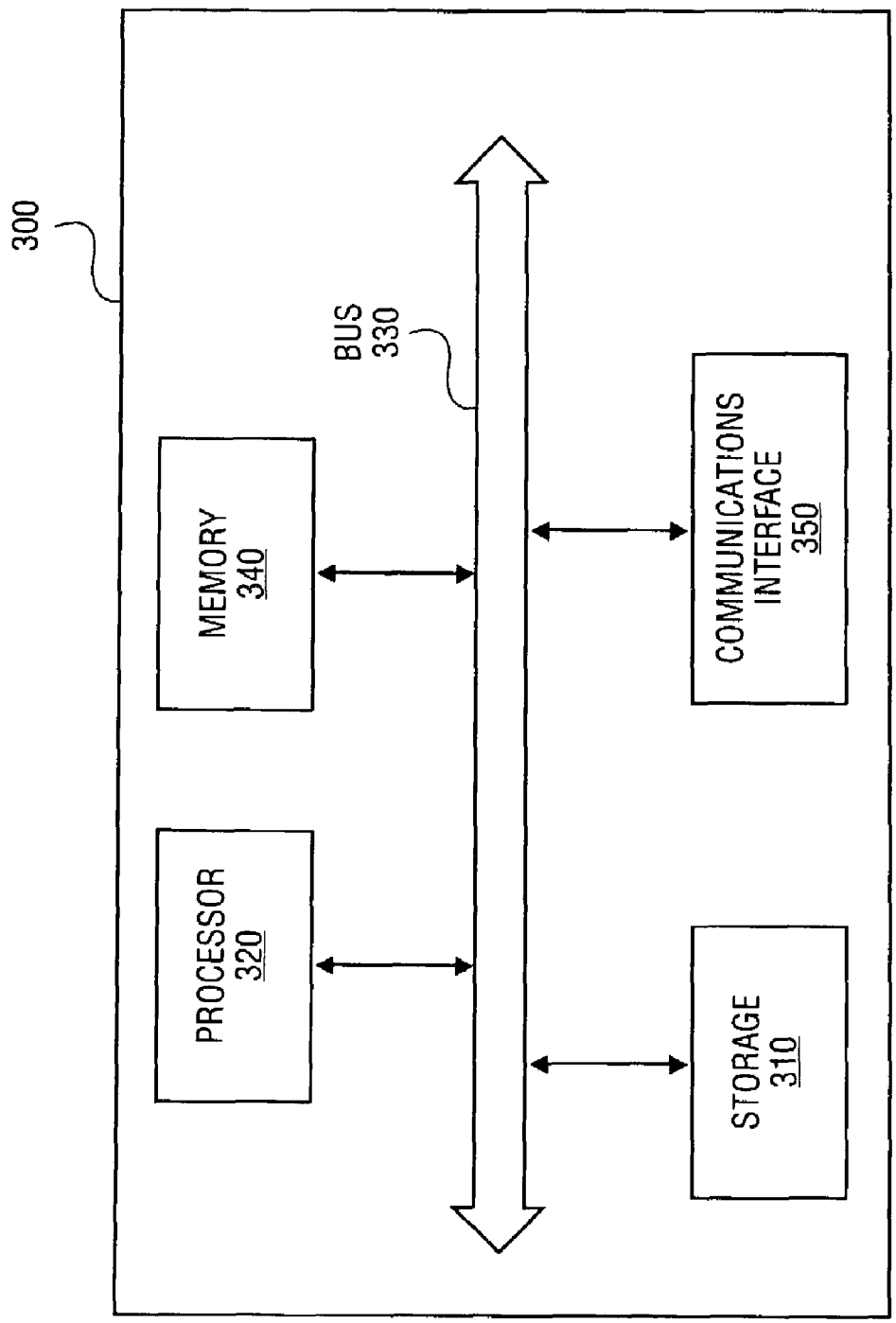
FIG. 3 illustrates a computing system that may represent a central computing system or external computing system in accordance with one embodiment of the present invention.

FIG. 3 illustrates a computing system that may represent a central computing system or external computing system in accordance with one embodiment of the present invention. The method of the present invention may be implemented on the computing system shown in FIG. 3. The computing system 300, shown in FIG. 3, includes a storage unit 310. Storage unit 310 contains one or more sets of storage devices for storing data using Unicode or other character sets. The storage devices may be magnetic or optical storage media. Computing system 300 also includes one or more processors, shown collectively as the processor 320. The processor 320 may include a control unit, arithmetic unit and several registers with which to process information. The storage unit 310 communicates with the processor 320 via a bus 330 that may be a standard bus for communicating information and signals. The processor 320 is capable of responding to commands and provides the capability for computing system 300 to perform tasks and execute software programs stored within storage unit 310. The process of performing a validation service and responding to prospective character set failures in accordance with the present invention may be implemented by hardware and/or software contained within the computing system. For example, memory 340, also coupled to the bus 330, may be used for storing program code that may be executed by the processor 320. Memory 340 may be random access memory (RAM) or some other machine-readable medium. The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals. Computing system 300 also includes a communication interface 350 also coupled to bus 330 for interfacing computing system 300 with other computing systems in a network as described above in reference to FIG. 1.

Figure 4:
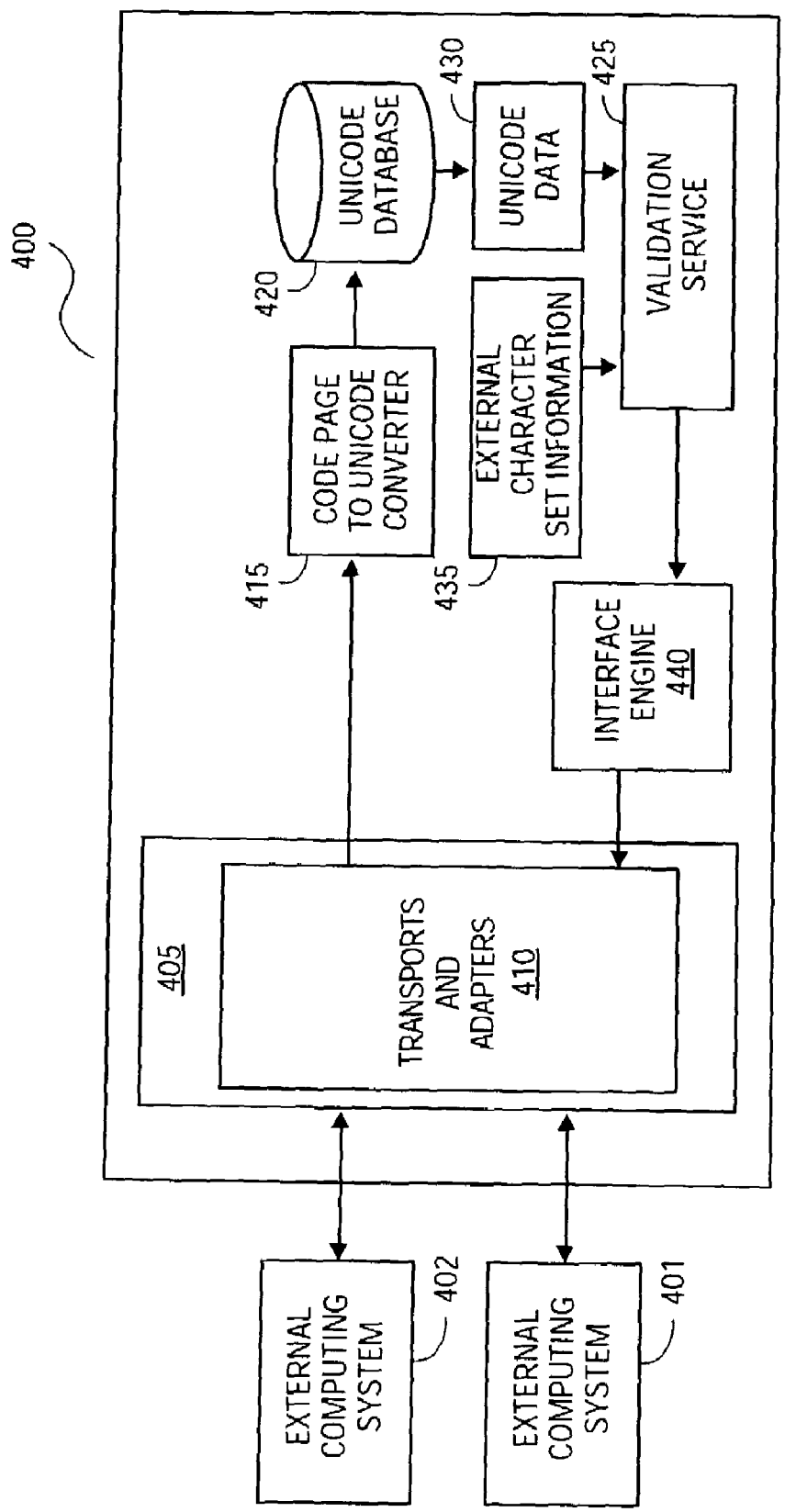
FIG. 4 illustrates a software media diagram for a central computing system in accordance with one embodiment of the present invention.

FIG. 4 illustrates a software media diagram for a central computing system in accordance with one embodiment of the present invention. Software media 400 includes an application server 405 that uses a set of transports and adapters 410 to communicate with external computing systems 401 and 402.

The external computing systems 401 and 402 may store data to the central computing system. For example, external computing system 401 using a western European character set may store data, in Unicode format, to the central computing system's Unicode database 420. The transports and adapters 410 use the character set conversion facilities 415 to convert data received from external computing systems to the common Unicode format. The application server 405 stores the data in the Unicode database 420.

The external computing systems 401 and 402 may request access to data stored on the central computing system's Unicode database 420. For example, external computing system 402 using a Japanese character set may request the data stored to Unicode database 420 by external computing system 401.

The validation service 425 uses the requested Unicode data 430 and the external character set information 435 to simulate character set conversion at the external computing system 402. The validation service identifies the prospective character set conversion failures and error-handling response of the external system requesting data. The validation function is invoked and performed prior to sending data to the external computing system.

Logic programmed into the interface engine 440 causes the central computing system to respond to the validation service results in any number of ways as described above in reference to FIG. 2.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
receiving a request at a central computing system to transfer data to a first computing system using a first character set from a second computing system using a second character set, the first character set a subset of the second character set;
performing a simulated conversion of the data from the second character set to the first character set at the central computing system; and
performing a predetermined act based upon a result of the simulated conversion at the central computing system, wherein the result of the simulated conversion includes identification of character set conversion failures or identification of the error-handling response of a character set conversion process of the first computing system.

2. The method of claim 1, wherein the second character set is Unicode.

3. The method of claim 2, wherein the first character set is selected from the group consisting of U.S. ASCII, western European, Cyrillic, Arabic, Greek, Japanese, and Chinese.

4. The method of claim 1, wherein the predetermined act is selected from the group consisting of preempting data transmission from the second computing system to the first computing system, logging character set conversion failures, converting the data from the second character set to the first character set and providing substitution characters for the data such that the first computing system will accept the data, transmitting the data to a third computing system, transmitting the data as requested.

5. A system comprising:
a central computing system using a superset character set; and
a plurality of external computing systems using one of a plurality of character sets, each of the plurality of character sets a subset of the superset character set, such that upon a request to transfer data to an external computing system, the central computing system will perform a simulated conversion of the data from the superset character set to the character set of the requesting external computing system and perform a predetermined act based upon a result of the simulated conversion, wherein the result of the simulated conversion includes identification of character set conversion failures or identification of the error-handling response of a character set conversion process of the external computing system.

6. The system of claim 5, wherein the superset character set is Unicode.

7. The system of claim 6, wherein each of the plurality of character sets is selected from the group consisting of U.S. ASCII, western European, Cyrillic, Arabic, Greek, Japanese, and Chinese.

8. The system of claim 5, wherein the action is selected from the group consisting of preempting data transmission from the central computing system to the external computing system, logging character set conversion failures, converting the data from the superset character set to the character set of the external computing system and providing substitution characters for the data such that the external computing system will accept the data, transmitting the data to a different external computing system, transmitting the data as requested, and combinations thereof.

9. A machine-readable medium that provides executable instructions, which when executed by a computing system, cause the computing system to perform a method comprising:
receiving a request at a central computing system to transfer data to a first computing system using a first character set to a second computing system using a second character set, the first character set a subset of the second character set;
performing a simulated conversion of the data from the second character set to the first character set at the central computing system; and
performing a predetermined act based upon a result of the simulated conversion at the central computing system, wherein the result of the simulated conversion includes identification of character set conversion failures or identification of the error-handling response of a character set conversion process of the external computing system.

10. The machine-readable medium of claim 9, wherein the second character set is Unicode.

11. The machine-readable medium of claim 10, wherein the first character set is selected from the group consisting of U.S. ASCII, western European, Cyrillic, Arabic, Greek, Japanese, and Chinese.

12. The machine-readable medium of claim 9, wherein the action is selected from the group consisting of preempting data transmission from the second computing system to the first computing system, logging character set conversion failures, converting the data from the second character set to the first character set and providing substitution characters for the data such that the first computing system will accept the data, transmitting the data to a third computing system, transmitting the data as requested.

13. A method comprising:
a central computing system receiving data from a first external computing system, the data in a first data format;
converting the data to a second data format, the second data format a superset of the first data format;

receiving a request to transfer the data to a second external computing system, the second external computing system using a third data format, the third data format a subset of the second data format;

performing a simulated conversion of the data from the second data format to the third data format at the central computing system; and performing a predetermined act based upon a result of the simulated conversion at the central computing system, wherein the result of the simulated conversion includes identification of character set conversion failures or identification of the error-handling response of a character set conversion process of the external computing system.

14. The method of claim 13, wherein the second data format is Unicode.

15. The method of claim 14, wherein the third data format is selected from the group consisting of U.S. ASCII, western European, Cyrillic, Arabic, Greek, Japanese, and Chinese.

16. The method of claim 13, wherein the action is selected from the group consisting of preempting data transmission from the second computing system to the first computing system, logging character set conversion failures, converting the data from the second character set to the first character set and providing substitution characters for the data such that the first computing system will accept the data, transmitting the data to a third computing system, transmitting the data as requested.

* * * * *